(12) United States Patent
Bernard et al.

(10) Patent No.: US 11,691,362 B2
(45) Date of Patent: Jul. 4, 2023

(54) METHOD AND DEVICE FOR IN SITU MARKING A WORKPIECE IN A THERMAL FORMING PROCESS

(71) Applicant: matriq AG, St. Gallen (CH)

(72) Inventors: André Bernard, St. Gallen (CH); Klaus Dietrich, Altach (AT); Mathias Mächler, Gams (CH); Cornelia Nef, Buchs (CH)

(73) Assignee: matriq AG, St. Gallen (CH)

( * ) Notice: Subject to any disclaimer, the term of this patent is extended or adjusted under 35 U.S.C. 154(b) by 0 days.

(21) Appl. No.: 17/480,271

(22) Filed: Sep. 21, 2021

(65) Prior Publication Data

US 2022/0097324 A1    Mar. 31, 2022

(30) Foreign Application Priority Data

Sep. 25, 2020    (EP) ..................................... 20198550

(51) Int. Cl.
*B29C 71/02*  (2006.01)
*B29C 44/34*  (2006.01)

(52) U.S. Cl.
CPC .......... *B29C 71/02* (2013.01); *B29C 44/3415* (2013.01)

(58) Field of Classification Search
CPC ............ B29C 49/42834; B29C 66/028; B29C 66/0246; B29C 63/0056; B29C 35/0288; B29C 35/02; B29C 44/3415; B29C 71/04; B29C 71/02
See application file for complete search history.

(56) References Cited

U.S. PATENT DOCUMENTS

| 3,961,575 A | 6/1976 | Rodabaugh |
| 2015/0017390 A1 | 1/2015 | Mine et al. |
| 2019/0329465 A1 | 10/2019 | Dietrich et al. |

FOREIGN PATENT DOCUMENTS

| DE | 102 42 565 A1 | 4/2003 |
| EP | 3 159 131 A1 | 4/2017 |

OTHER PUBLICATIONS

European Search Report of No. 20 19 8550.4 dated Mar. 3, 2021.

*Primary Examiner* — Stella K Yi
(74) *Attorney, Agent, or Firm* — Sughrue Mion, PLLC

(57) ABSTRACT

A method for marking a workpiece (6) uses a device, wherein the workpiece (6) is formed at least partially in a thermal master or forming process, comprises a surface (10) directed towards the workpiece (6), wherein a number of individually controllable heating elements (2) is distributed behind the surface (10) for a local heating of a workpiece surface portion. Each of the heating elements (2) comprises a solid material (11) having a surface structure and a heating structure (3), wherein the surface (10) directed towards the workpiece (6) encompassing the surface structures (40) has a uniform smooth surface allowing to dark, burn or foam the surface (7) of the workpiece (6) through heat introduction.

5 Claims, 4 Drawing Sheets

METHOD AND DEVICE FOR IN SITU MARKING A WORKPIECE IN A THERMAL FORMING PROCESS

TECHNICAL FIELD

The present invention relates to a method and device for in situ marking a workpiece in a thermal forming process, and a device for in-situ marking of a workpiece in a thermal forming process.

PRIOR ART

From DE 102 42 565A1 a method has become known in which the marking takes place by generating convex curvatures in the material surface by supplying electromagnetic radiation through a cavity.

EP 3 159 131 A1 discloses a device for marking a workpiece formed at least partially in a thermal master or forming process, wherein the device comprises a plurality of surface-distributed, individually controllable heating elements for a local heating of a workpiece surface, wherein each of the heating elements has a heating structure embedded in solid material, wherein the solid material has a surface structure directed to the workpiece surface, wherein the surface structure associated to a heating element has a predetermined or statistical topography and is heated at least partially by the heating structure.

EP 3 159 131 A1 discloses the features of the preamble of present claim 1 and is related to a marking of formed pieces within the injection molding process, i.e. at the end of the process before ejecting the pieces so that each piece can be marked individually.

U.S. Pat. No. 3,961,575 relates to a printing apparatus having a back plate integrally connected to a ram capable of reciprocating or being stationary. The back plate has a surface that corresponds to the printing surface. A die carrying indicia is made to adjust to the contour of the printing surface automatically by use of spring bias means or resilient padding. Insert heaters are connected to each die.

US 2019/329465 A1 discloses a device for marking a work piece that is at least partially formed or reshaped through a thermal process. The device includes a plurality of heating elements distributed laterally on a surface that is placed against the work piece and can be individually controlled for local heating of a work piece surface. Each of the heating elements includes a solid material with a surface structure and a heating structure. The surface structure includes at least one of a specifically or randomly varied topography. The surface structure can be at least partially heated through the heating structure.

US 2015/017390 A1 discloses a molding method for a fiber reinforced composite material, a cavity forming surface of a second mold with a recessed portion for molding a thick portion is brought into contact with a fiber reinforced composite material. The fiber reinforced composite material is heated in a state in which the temperature of the cavity forming surface is higher than that of a cavity forming surface of a first mold. After that, the first mold and the second mold are closed with a pressure to the fiber reinforced composite material so as to pass the fiber reinforced composite material into the recessed portion.

SUMMARY OF THE INVENTION

Providing nanostructures in the surface created by an array of heating elements does not allow using the method and such a device for all kinds of plastics and colors. The prior art method is more efficient on dark plastics and cannot be used for brightly colored plastics.

It is therefore an object of the present invention to provide a device and method for in-situ marking a workpiece which is formed at least partially in a thermal master or forming process which allows readability of such codes with simpler reading devices at a larger range of plastics and colors of the formed pieces.

A further issue with the method of the prior art is the wear of the nanostructures at the surface structure directed to the workpiece surface. The nanostructures surface becomes less performant after a limited number of formed pieces. It is therefore a further object of the present invention to provide a device and method marking in-situ of a workpiece formed at least partially in a thermal master or forming process which allows a longer tool life.

The device used in a method according to the invention for marking a workpiece, when said workpiece is formed at least partially in a thermal master or forming process, comprises a surface directed towards the workpiece, wherein a number of individually controllable heating elements is distributed behind the surface for a local heating of a workpiece surface portion. Then each of the heating elements comprises a solid material having a surface structure and a heating structure, wherein the surface directed towards the workpiece encompassing the surface structures has either a roughened surface having a Ra-value of greater 1 micrometer or a uniform smooth surface having a Ra-value of less than 100 nanometer allowing to darken, burn or foam the surface of the workpiece through heat introduction.

The device can be a tool or a tool insert for use as in-situ marking within the thermal forming process.

The heating structure is preferably arranged in the solid material in a predetermined distance from the surface structure, especially behind a coating of the inner surface. The solid material of the heating elements can comprise a plurality of superimposed thin or thick layer produced or PCB printed layers. This allows a close arrangement of the heating elements behind the surface to be heated and a quicker direct impact of the heating energy on the darkening or foaming effect within the formed product/workpiece.

The surface structure can be made of a low-wear material or coated with such low-wear material. The smooth surface of the entire marking area together with a low-wear material enhances the quality of the marking and the tool life.

The heating elements can be arranged regularly, preferably in matrix form, allowing a free predetermined definition of the marking in the marking area. On the other side or additionally, heating elements can be arranged arbitrarily instead of a matrix form, then preferably as parts of letters, numbers, or decorative elements, e.g. as a 7-segment display.

The heating elements can be electrical, (thermo)fluidic, optical or chemical heating elements.

A system for marking a workpiece formed at least partially in a thermal forming or forming process comprises a device as mentioned above and a controller, wherein the controller is configured to energize the heating elements for heating one or more of them serially, in parallel or in groups to darken, burn or foam the surface of a workpiece formed in such a forming process and mold.

A method for marking a workpiece in a thermal forming or forming process, using the above mentioned system has a controller energizing predetermined heating elements for creating a predetermined marking through darkening, burning or foaming of the surface portion of the workpiece associated to said predetermined heating elements. This energizing action can occur while the forming process takes places, but certainly after the filling of the mold cavity with the workpiece material. Then, according to this embodiment, the workpiece material is in contact with the surface of the heating element.

It is also possible to modify the in-situ method of marking the workpiece to heat the heating elements only while the mold is already opening. Then the workpiece is no longer in direct contact with the heating surface of the device but in close relationship with a distance between the surface of the workpiece and the surface of the associated heating element of between 0.001 and 1 millimeters. The distance is predetermined that the darkening or foaming effect still takes places. Here, the change of the surface occurs based on local heating of the workpiece through thermal radiation. The advantage of the two-step approach is based on the darkening and smoothening action of the thermal radiation in a small distance of the workpiece, small enough to heat the surface but large enough to allow a smoothening material flow. It is possible to form a rough surface based on a rough inner surface of the insert with a tool surface with a Ra-value greater than 1 micrometer. Then heating of the workpiece, even in presence of a rough inner surface of the insert, locally smoothens the workpiece and increases the contrast between smoothened and original workpiece portions.

The invention is based on the insight that the surface structure directed to the workpiece surface is preferably smooth and even, since this embodiment of the method according to the invention is based on carbonization and foaming of the surface of the workpiece. This extends the life time of the heating surface and provides a surface of the work piece which bears a more easily readable marking. It is further noted that the rough surface (for smoothing) in contrast to the nanostructure is also less sensitive to wear, since a certain wear and tear has only a minor influence.

Within the prior art method according to EP 3 159 131 A1, the heating elements were heated to allow the plastics material to become liquid again and take the form of the surface of the work piece at the heated structure. According to the present invention, the energy delivered to the individual heating elements of the array is high enough to alter the plastics material creating blisters or bubbles and changes its color to grey or black. The term altering comprises decomposing, disintegrating and deteriorating in the sense of: decomposing to foam, darken, crack or crosslink chemical bonds of the workpiece material to change color of the polymer or of an additive. The current delivered to the heating elements of the array chosen to be active is high enough to effect these thermic decomposition process which is known in the laser marking technology. The possible optical contrast is very high in view of the darkening blister creation.

It is an advantage of the present invention to provide a method which can be applied to plastics of light color, filled or crystalline plastics as well as reinforced plastics, i.e. plastics where the method according to the prior art provide a non-satisfactory effect.

A further advantage of the present solution is the reduced costs for building such a form since no nanostructured surface is necessary but a simple smooth surface is ok which reduces beside the costs the necessity for the additional manufacturing step of the mold. Furthermore, the tool life is extended especially if workpieces made out of filled plastics are to be prepared which usually drastically reduced the life time of the nanostructure marking surfaces.

The necessary optical contrast of the code provided by the marking distribution based on the heating elements is achieved through use of a smooth mold surface. The contrast is especially good for transparent or dark colored plastics (as it was by application of the prior art technique). Filled or reinforced plastics as well as brightly colored plastics can be marked with high contrast when using the teaching of the invention, i.e. when the heating creates foaming or disintegration.

Preferably, the workpiece surface is covered by a hard coating as prepared by Nitride or a Carbide layer or other known hard coatings. Such a surface provides even after losing through wear minus several 100 nanometer layer coating the same functionality as the originally prepared work surface coating.

Preferably, the device is a tool or a tool insert for a thermal forming process, preferably for thermoformable plastics.

In a preferred embodiment, the heating structure is arranged spaced from the surface structure in the solid material of the heating element advantageously between 10 nanometers and 100 micrometers.

Heating structures are preferably ohmic conductors which, when energized, emit Joule heat as heat energy for heating, the heat reaching the surface structure mainly by means of heat conduction. This is in contrast to structures that try to heat the workpiece mainly with thermal radiation.

Depending on the nature of the workpiece material, a predetermined heating time is required to heat the workpiece surface to the extent that addressed surface portion can deteriorate and foam, i.e. have an effect far beyond a simple fusing of the work piece surface. Preferably, the heating time is about 0.001 to 1 seconds.

Smoothing of initially roughened surfaces, which is understood in the framework of this description to have a tool Ra-value of greater than 1 micrometer, creates a greater contrast between the then smoothened surfaces so that this is achieved with a two step process. The first step comprises the thermal forming process with an initial rough surface of workpiece surface with closed mold, wherein the rough surface is due to the tool surface in front of the heating elements, but which heating elements are not heated in this first step. This first step is followed by a second step with partly opened mold with the tool/insert surface in a predetermined distance to apply a heating round smoothening the initially rough surface.

This heating can also comprise to provide sink marks, when the surface topography was already smooth. Although the structure of sink marks can be influenced upon, it is mainly a binary marking in front of each heating element: The sink-mark is created or it is not created.

Within the burning (=darkening) or foaming (=brightening) the surface different gray colours can be achieved, wherein the difference is mainly based upon the heat insertion which can be modulated over time or different heating energy. These markings are therefore not binary but can be distinguished between different shades of gray.

It is possible to open the mold, e.g. between 0.001 to 1 millimetres, to apply the heating step. It is also possible to have the mold closed but with a relieved locking unit to apply the a heating step, either a single heating step or a second heating step, when a first heating step was provided in the fully closed state.

It is possible to obtain the effect of improved contrast by creating sinkmarks. Based on an volume enhancement of the polymer when liquefied by the heater, it forms a local hump. This happens only when the mold is not closed anymore. When the heater is turned off, the polymer solidifies again beginning at the surface portion while the volume is still enhanced. The solidification proceeds while the polymer shrinks again, which forms a sink mark. The volume of the molten material is the same before and after the marking process, but it's distribution is changed from the unaltered surface.

A further possibility is the use of an additive as part of the composition of the injection molding polymer. Such particles or molecules are added to the original polymer before processing (e.g. as so called "master batch"). This is common practice in laser marking, where the carbonization or foaming of the injection molded part is (in some cases) only possible with an additive. In the case of the laser the additive acts as an optical absorbing material which converts the optical energy of the laser into thermal energy, when the polymer itself absorbs only little. In the present case, the amount of available energy is not so relevant and can be lower compared to a laser, since the heat energy transfer to the polymer is not the critical aspect. The additive is the molecule or particle that is directly altered. The additive reacts at a certain threshold temperature, which is well above the processing temperature of the polymer but can be reached by the heating elements. The additive then might: change its color due to decomposition or forming of a new chemical bond (possible bonds: intra additive, inter additive or polymer-additive), change its fluorescence properties, liberate gas (N2, CO2, . . . ) and present foaming, recrystallize, exsolve from the polymer, color change, carbonization etc. All of these will change the visual properties of the heated surface. Possible additives are inter alia hydrated zinc borate or compounds as disclosed in EP 0 675 001 A1 on page 3, lines 20 to 40. Flame retardants can also be used.

The wording that the method happens in a thermal forming process comprises the fact and embodiments, where the marking method step is conducted after (slight) opening of the mold, i.e. at the end of the forming process, when the workpiece is already formed, but not (completely) marked. It is considered that the thermal forming process comprises the marking and is only considered completed after the marking took place and the work piece is ejected from the thermal forming machine.

The table shows different embodiments according to the invention:

| Embodiment | Tool surface | Mold status | Additive | Appearance change |
|---|---|---|---|---|
| Foaming | Polished | Opened/Closed | Yes | brighter (especially for darker polymers) |
| Burning | Polished | Opened/Closed | No/(yes) | darker (especially for brighter polymers) |
| Smoothing | Rough | Opened | No/(yes) | gloss instead of rough |
| Sink mark | (Rough)/Polished | Opened | No/(yes) | visible sink mark |

The term "closed" for the mold status relates to a one-step marking during the thermal forming process. The term "opened" refers to an either one- or two-step marking process during and at the end of the thermal forming process; "one-step", if the heating elements are only activated when the mold is opened; "two-step", if the heating elements are (at least partially) activated when the mold is closed. Additive "yes" relates to the presence of an additive, whereby "(yes)" in brackets relates to an optional presence of such a heating sensitive additive.

The marking occurs only in the "opened" state of the in-situ thermal forming, i.e. after the thermal forming step for the two embodiments smoothing or sink mark, wherein "smoothing" provides a glossy surface based on a original rough formed surface, whereas "sink mark" relates to the phenomenon of the same name in a otherwise smooth surface.

"Foaming" and "Burning" can be conducted in a closed environment, but the development of the foamed surface and the burning under external oxygen from the air improves the effect over an embodiment with a closed mold.

The tool surface has a surface structure of the solid material in front of the heating elements. Said surface structure is an uniform surface over the entire front of the heating elements. It can be preferably a smooth surface with a Ra-value of less than 100 nanometer or—especially for the smoothing embodiment an uniformly rough surface with a Ra-value of more than 1 micrometer. However, it is important for preferred embodiments that the Ra-value is not between 100 nanometer and 1 micrometer, which is the common technical feature of the preferred embodiments. Only the "sink mark" embodiment can use any surface with a clear preference for polished surfaces followed by rough surfaces but can also be applied for intermediate surfaces.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
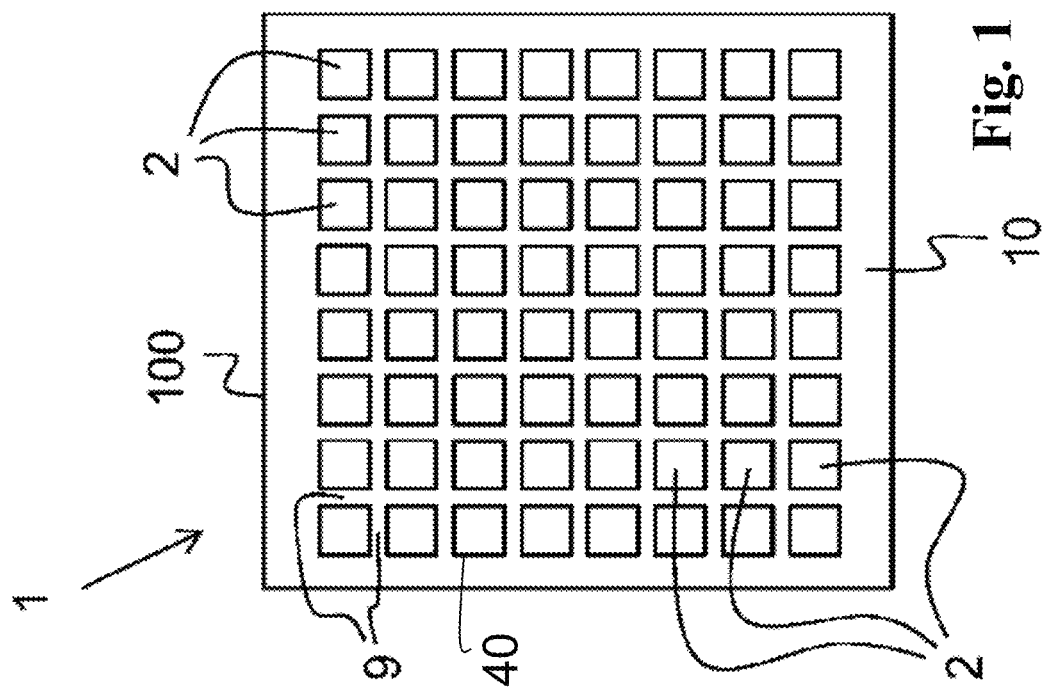
FIG. 1 shows a schematical plan view on the surface of a tool/insert according to an embodiment of the invention with usually not visible heating element surface areas; formed with the tool/insert of FIG. 1 with symbolically shown heated areas.

FIG. 1 shows a schematical plan view on the surface of a tool/insert 1 according to an embodiment of the invention with usually not visible heating element front surface areas 2 on the tool surface 10, i.e. the tool surface 10 appears to the human eye flat and no features can be distinguished. The different heating element front surfaces 2 are shown as areas which can be heated according to the signals of a control unit.

Figure 3:
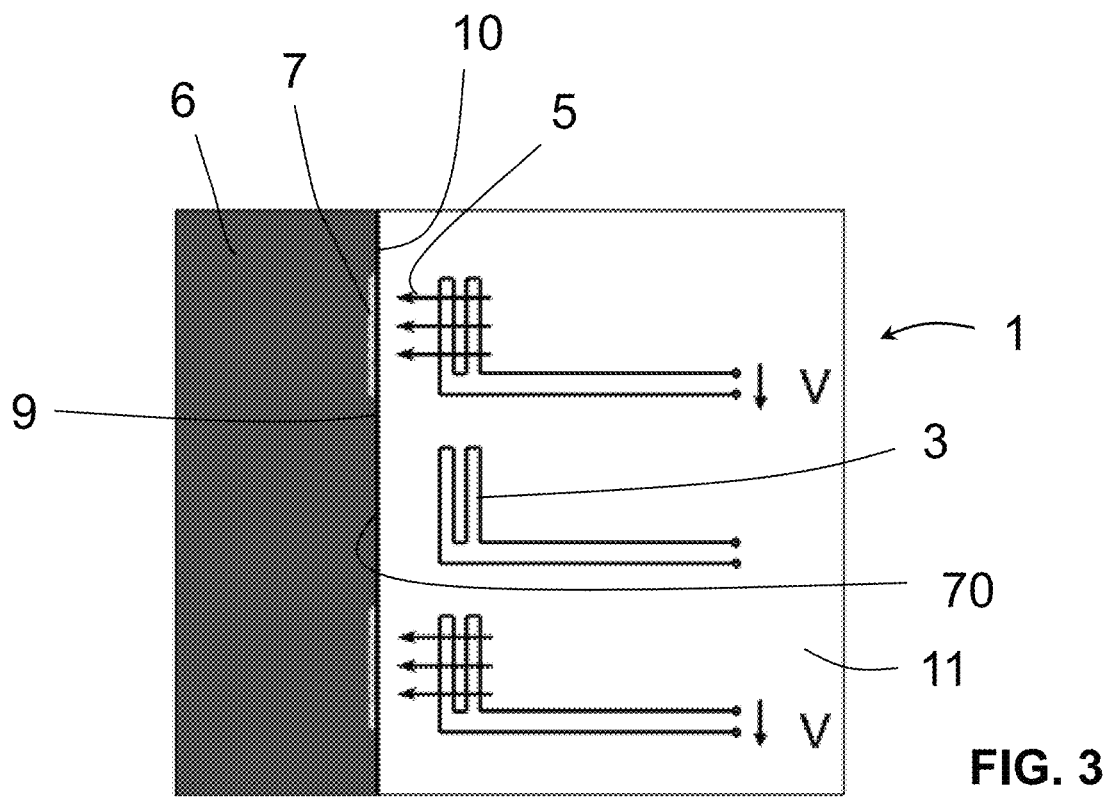
FIG. 3 shows a schematic side sectional view through a tool/insert according to an embodiment of the invention with a just formed workpiece.
Figure 4:
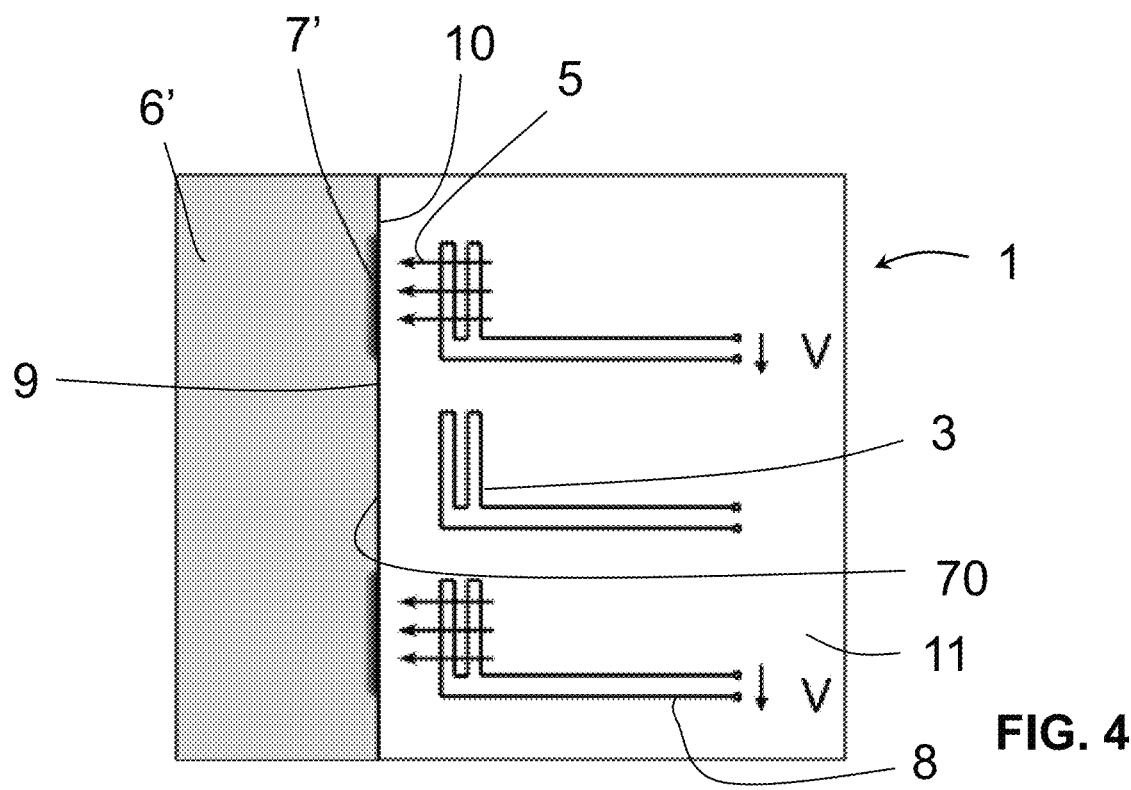
FIG. 4 shows a schematic side sectional view through a tool/insert according to an embodiment of the invention with a just formed workpiece region.

The heating elements, responsible for heating up the heating element front surfaces 2, and which heating elements are shown in FIGS. 3 and 4, are distributed in matrix form, wherein each heating element front surface 2 has an extension in the micrometer to millimeter range, preferably with side lengths between from 10 micrometers to 5 millimeters. Each heating element front surface 2 is separated one from another by a web portion 9, preferably with a width of the order of 1 micron to 500 microns. Of course, it is not necessary to have square heating element front surfaces 2 but information is usually shown in pixel and every heating element front surface 2 is intended to provide one pixel of information.

Alternatively, there may be an optically unobservable distance between the individual heating element front surface areas 2, i.e. the individual heating element front surface areas 2 are adjacent one beside another. FIG. 1 shows an arrangement of eight by eight heating elements with square heatable surface structures 40, which are spaced from one another through said web portions 9 of equal width.

Figure 2:
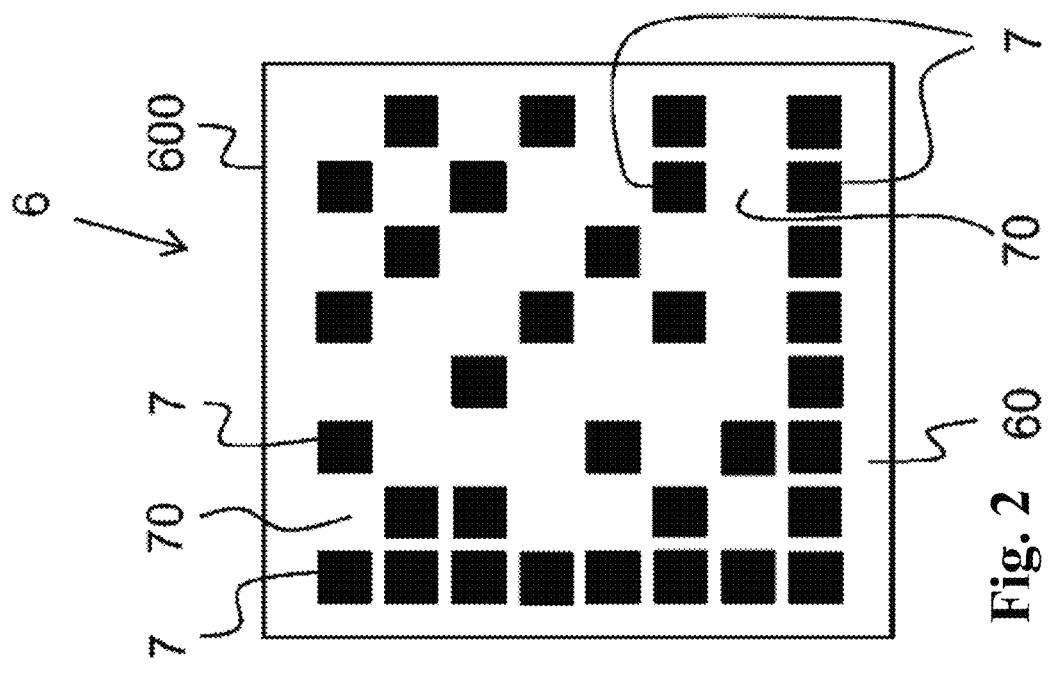

FIG. 2 shows a view on the surface of the workpiece 6 having been formed with the tool/insert of FIG. 1 with symbolically shown heated areas 7. As shown in FIG. 2, it is possible to generate coding patterns in the underlying workpiece 6, which are comparable to a data matrix code or QR code. Such patterns can ideally be read by commercially available Data Matrix Code or QR Code readers. The heated areas 7 are shown in dark. However, the color of the heated area of the workpiece 6 does not darken necessarily. Within a foaming embodiment the heated areas become brighter.

The tool or tool insert 1 includes a structure embedded therein or applied thereto, which has been produced by thin-film technology, thick-film technology, ceramic cofiring as HTCC or LTCC or PCB technology and which contains individually controllable inner heating structures 3.

The surface of the heating element front surfaces 2 and of the additional in-between web portion structures 9 are smooth or polished with a Ra value of less than 100 nanometer. In a different embodiment the heating element front surfaces 2 the additional in-between web portion structures 9 are rough with a Ra-value of higher than 1 micrometer. The heater elements are in a preferred embodiment as close to the surface 7 and 70 as possible for a direct immediate heating effect. These two different tool inserts are available for the three different marking procedures, i.e. sink-mark generation, foaming and burning. Within an embodiment of marking in the opened state, the heating step can take place only in the open state, since the roughness of the front surface 2 can be so coarse that it is usually molded.

The tool insert 1 with the described heating elements 3 can be assigned to any position of the workpiece 6 within an arbitrary area.

In the embodiment shown in FIG. 1, the heating structure 3 can form at least part of the surface structure 40.

FIG. 3 shows a schematic lateral sectional view through a tool insert according to the embodiment of FIG. 1 according to the invention with a solid workpiece 6, as shown in FIG. 2, wherein the individual heating elements 3, or their surface structures 40, are arranged next to each other with a small spacing 9.

The design of the heating structure 3, as well as the heat conduction in the solid material 11 of the mold or the heat conduction to the surface structure 40 determines which region can be shaped on a workpiece 6 and which region will not be altered.

The surface 10 of the tool or tool insert 1 has a uniform surface finish, which can be produced by a surface treatment. Therefore the surface elements 2 as "shown" in FIG. 1 are not visible to the human eye, unless the heating cycle starts and then the result can be seen in the workpiece 6 as shown in FIG. 2.

FIG. 4 shows a plan view of the tool insert according to the invention as in FIG. 3, wherein the filling molded workpiece 6' has a brighter color from the start than the workpiece 6 in FIG. 3. The difference between the molded workpiece 6 of FIG. 3 and the workpiece 6' of FIG. 4 is the heating effect on the workpiece 6, 6'. The darkened or burned surface structure 7' in the brighter workpiece 6' has usually a higher contrast than the darkened surface structure 7 in the darker workpiece 6.

A further difference between the two workpiece 6, 6' surface structures 7 and 7' can occur based on the material of the workpiece 6 or 6'. Beside a darkening effect, it is also possible that the heating elements 2 heat the surface 2 in a way with a sufficient heat introduction that the material is foaming and/or partially destroyed so that a surface degradation appears in such surface areas 7 and 7'. Foaming is specifically suitable for darker workpieces 6, because this generates brighter surface portions 7, which is not as advantageous for brighter workpieces 6', where darkening by carbonization 7' is preferred.

A seamless arrangement of the heating elements (without web-space 9) can create coherent impressions on the workpiece. By the number of juxtaposed and stacked heating elements, an arrangement can be made available, which allows a very large number of possible marking combinations.

The control of the heating elements 2 can either be taken over directly by a controller of a control unit of the original or forming machine or executed by a controller of a separate control device.

In the second case, the heating process, i.e. the heating of the heating structure 3 of the respective heating element 2 is triggered by the original or forming process.

The heating of the individual heating elements 2 takes place here either serially, in parallel or in groups one behind the other.

A vertical cross section through the bottom three heating elements 2 of the second column from the left of the matrix arrangement in FIG. 1 is equal to the cross section shown in FIG. 3

Since only the upper and lower heating elements 3 experience a heat input 5, only their surface structure 2 is transferred to the workpiece 6 and produce there an optically recognizable imprint 7, i.e. light scattering surfaces or burned surface portions 7, while the region of the central (second) heating element 2 in the workpiece 6 produces no impression and leaves a substantially reflective surface 70 on the workpiece 6.

The same distribution of heated elements 2 could also be seen in the cross section shown in FIG. 4 for a horizontal cross section through the first three heating elements 2 of the top row, since the arrangement is configured substantially the same in both directions.

The heating elements 2 shown here have square surface structures 4. Alternatively, these may be configured circular, elliptical or triangular, rectangular or the like. The heating elements 2 can be arranged in any area 100 in the solid material 11 of the tool/insert 1.

In a uniform embodiment of all surface structures 40, the shape of the structure to be produced on the workpiece 6 can be predetermined by the choice of the shape of the heating structures 3.

Figure 5:
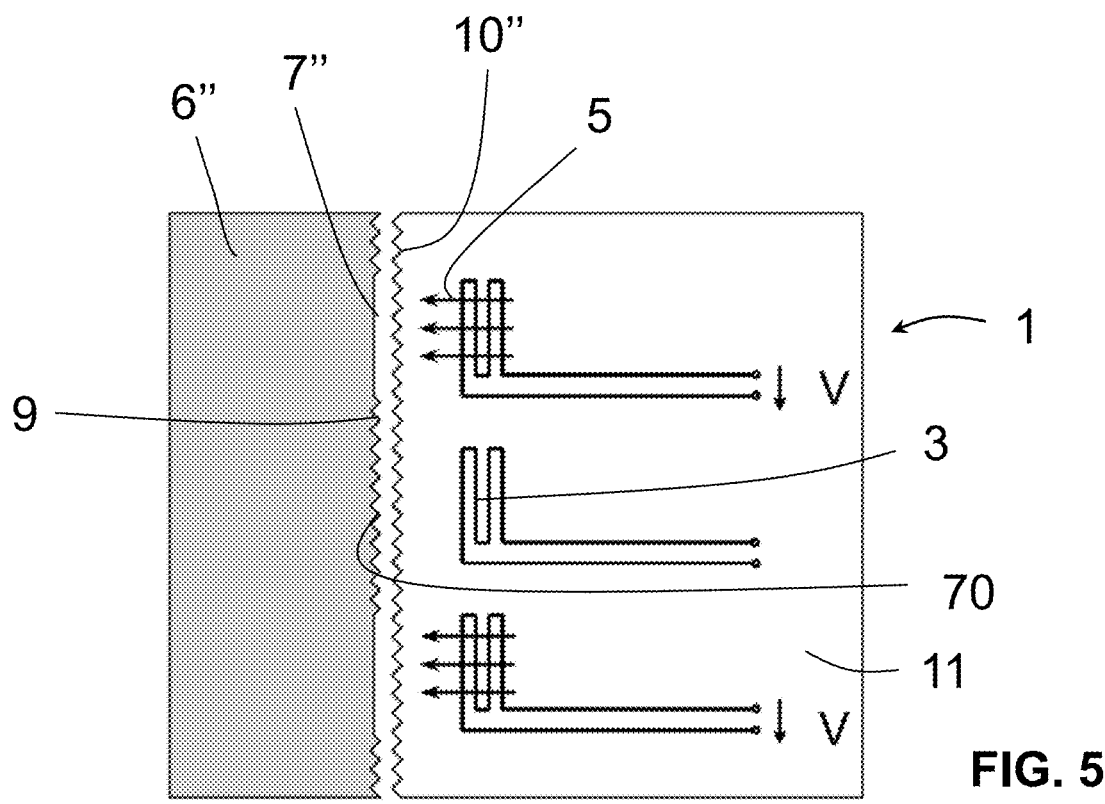
FIG. 5 shows a schematic side sectional view through a tool/insert according to an embodiment of the invention with a just formed and smoothened workpiece region.

FIG. 5 shows a schematic side sectional view through a tool/insert 1 according to an embodiment of the invention with a just formed and smoothened workpiece region 7". Therefore, the workpiece 6" and tool insert 1 are shown in a distance one from another. The tool insert 1 comprises a roughened tool surface 10", preferably also covering the separating web portion 9. Here, these roughened surface structures of the tool surface 10" are formed when the mold is closed. Upon opening the mold, there is a subsequent heating step. Therein, not heating the heating structure 3 leaves the surface portion 70 unaltered and rough as a roughened unaltered surface portion 70, whereas the subsequent heating via the heat input 5 during the opening step or during an intermediate interval after moving the mold a predetermined distance apart smoothens the heated surface portions to smoothened surface portions 7". This is a different alteration of the altered surface portions, here smoothened surface portions 7" before ejecting the workpiece 6" after said subsequent heating interval.

Figure 6:
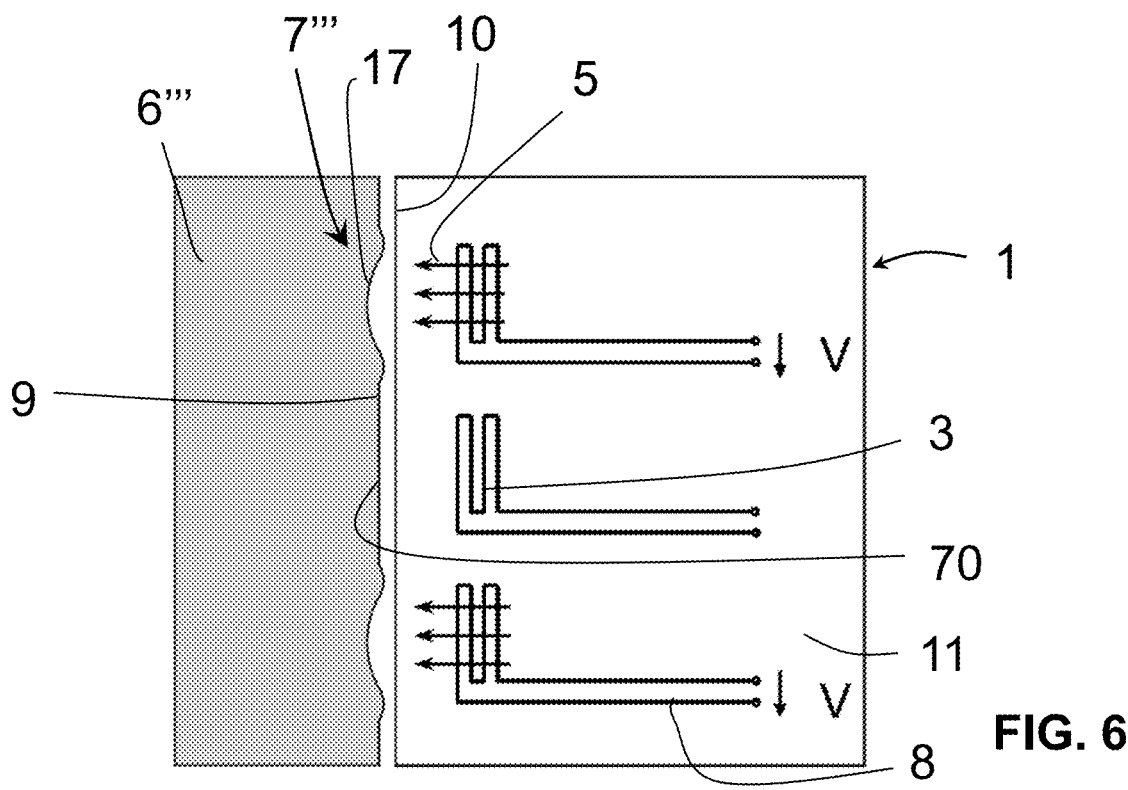
FIG. 6 shows a schematic side sectional view through a tool/insert according to an embodiment of the invention with a just formed and differently altered workpiece region.

FIG. 6 shows a schematic side sectional view through a tool/insert 1 according to an embodiment of the invention with a just formed and differently altered workpiece region 7'". The workpiece 6'" and tool insert 1 are shown in a distance one from another like in FIG. 5. The tool surface 10 is smooth as in the embodiments shown in FIGS. 3 and 4. The difference is the creation of sink marks 17 in the framework of sink mark surface portion 7'" with elevated edges. Therein, not heating the heating structure 3 leaves the surface portion 70 unaltered and smooth as a smooth unaltered surface portion 70, whereas the subsequent heating via the heat input 5 during the opening step or during an intermediate interval after moving the mold a predetermined distance apart provides . . . . The heat sink 17 with edges as altered surface portion 7". This is a different alteration of the altered surface portions, here surface portions 7'" before ejecting the workpiece 6'" after said subsequent heating interval.

FIG. 7A to FIG. 7F shows schematic side sectional views through a detail of the tool/insert of FIG. 6 from start of the method until the completion of a sink mark generation using not fully closed mold. The detail view shows one single heating structure 3 without the solid material of the tool insert 1 facing the unaltered surface portion 70 of workpiece 6'. The mold is no longer completely closed, the heating structure 3 is already retracted providing the gap between the smooth surface in front of the heating structure 3 and the facing unaltered surface portion 70.

Figure 7A:
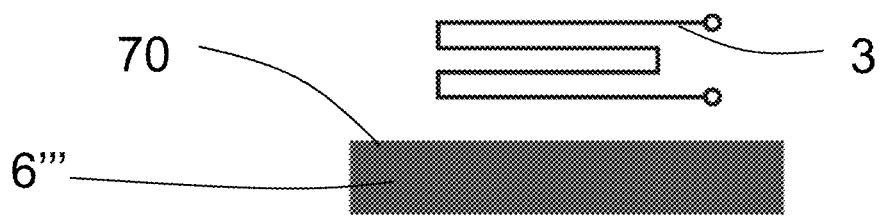
FIG. 7A to 7F shows schematic side sectional views through a detail of the tool/insert of FIG. 6 from start until the completion of a sink mark generation using not fully closed mold.
Figure 7B:
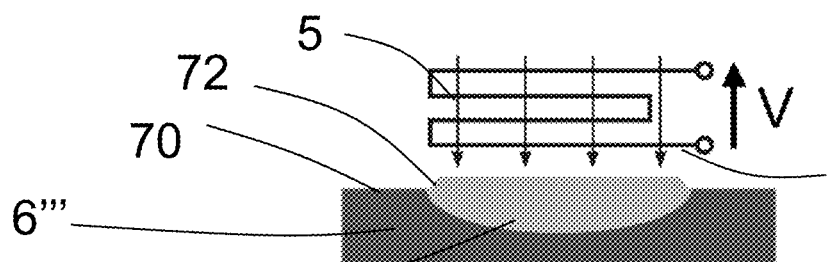

Initially, as shown in FIG. 7A, unaltered surface portion 70 of the workpiece 6 is essentially flat and in front of the flat tool surface 10 (not shown in FIG. 7A to 7F). Then a voltage V is applied between the free ends of the heating structure 3, as shown in FIG. 7B. Therefore, a heat input 5 is provided and melts the surface area of a liquefied surface portion 71 of the workpiece 6'" facing the heating structure 3. The liquefied surface portion 71 has a width covering essentially the area covered by the heating structure 3 and melts the surface area 70 of the workpiece 6' with a rounded convex form. Since heated polymer material takes more place, the liquefied surface portion 71 extends above the level of the cold unaltered surface portion 70 and creates a circular ridge 72. The ridge 72 has circular and there similar dimensions in view of the definition that the heating element front surface 2 of the preferred embodiments is of a square dimension.

Figure 7C:
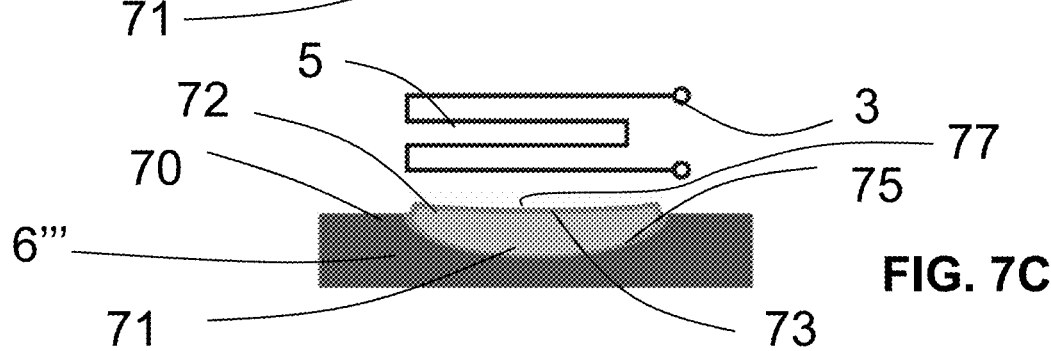

FIG. 7C shows the step after the heating step. Therefore, the heating structure 3 is no longer connected to the voltage supply. The liquefied polymer is flowing and creates a slight inner depression 73 showing the circular ridge 72. The inner core 74 of the liquefied surface portion 71 remains liquid, whereas the surface portions itself 75 begins to solidify as shown with the line encompassing the liquid inner core 74. The edge zone of the molten polymer portion becomes solid again, reducing the total volume and causing the upper surface layer 77 to sink in slightly. As the process continues, the layer thickness of the solidified edge zone and of the upper surface layer 77 increases continuously, whereby the total volume decreases continuously and the loss of volume is compensated by further sinking of the top surface layer 77 in the center of the heated area. Therefore, the reference numeral 77 for this slightly hardening top surface layer is only used in FIG. 7C to 7E, since in FIG. 7B there is no such top layer 77 and in FIG. 7E the hardening is already completed.

Figure 7D:
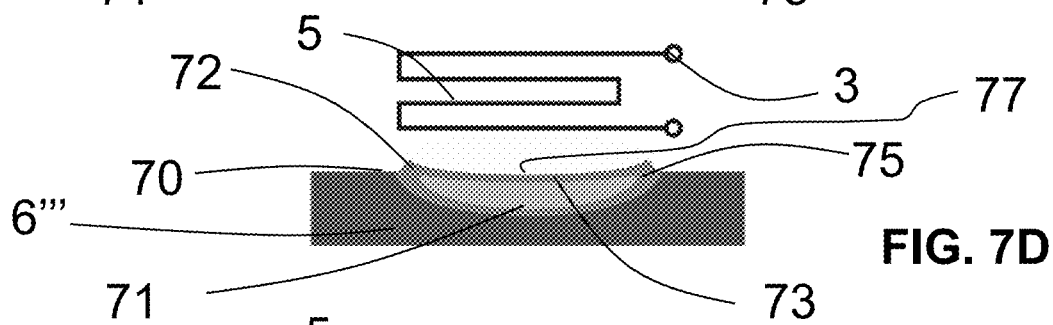
Figure 7E:
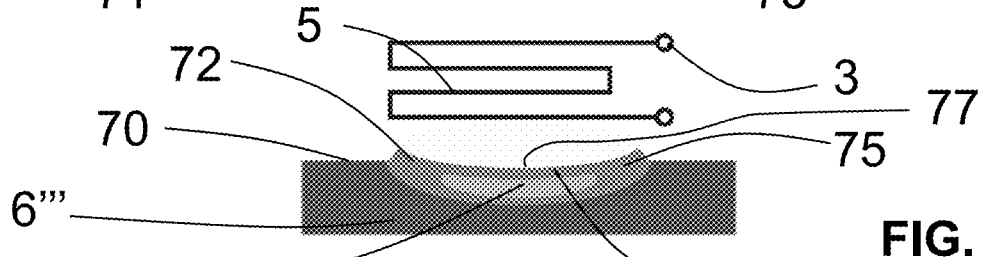
Figure 7F:
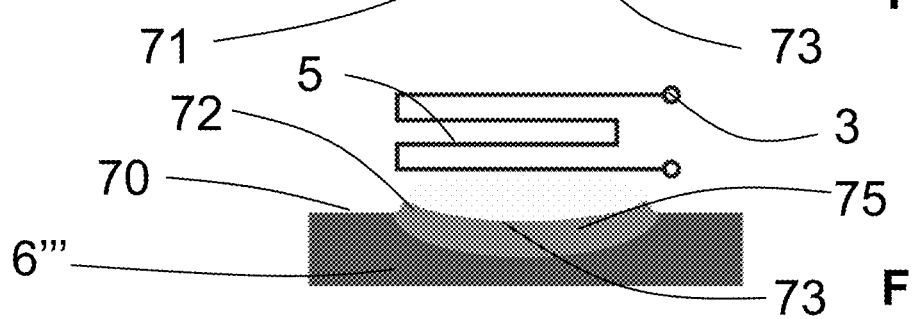

FIG. 7D and FIG. 7E show further steps of solidifying of the liquefied polymer 71 with a thicker solidified surface portion 75 and a shrinking still liquefied core, accentuating the inner depression 73, thus raising the circular ridge 72. FIG. 7F finally shows the final solidified status of the former liquefied surface portion. Of course, the now complete solid surface portion 75 is not separated from the unaltered surface portion. The still shown boundary line is explanatory. The main feature of workpiece 6'" is the flat unaltered surface portion changing to an elevated ridge 72 to an inner depression 73 creating the sink mark 17 as shown in FIG. 6.

LIST OF REFERENCE SIGNS

| | | | |
|---|---|---|---|
| 1 | tool insert | 10" | tool surface |
| 2 | heating element front surface | 11 | solid material |
| 3 | heating structure | 17 | sink mark |
| 5 | heat input | 40 | square heatable surface structure |
| 6 | workpiece | | |
| 6' | workpiece | 60 | work piece surface |
| 6" | workpiece | 70 | unaltered surface portion |
| 6'" | workpiece | 71 | liquefied surface portion |
| 7 | "burned" surface portion | 72 | circular ridge |
| 7' | darker or lighter surface portion | 73 | inner depression |
| | | 74 | liquid inner core |
| 7" | smoothened surface portion | 75 | solidified surface portion |
| 7'" | sink mark surface portion | 77 | central top sinking-in layer |
| 8 | electric line | 100 | border of the tool insert |
| 9 | separating web portion | 600 | border of work piece relating to tool insert |
| 10 | tool surface | | |

The invention claimed is:

1. A method for in-situ marking a workpiece in a thermal forming process of a polymer material, using a device comprising a surface directed towards the workpiece, wherein a number of individually controllable heating elements are distributed behind the surface for a local heating of a workpiece surface portion, wherein each of the individually controllable heating elements comprises a solid material having a surface structure and a heating structure, wherein the device further comprises a controller connected to the individually controllable heating elements, wherein the method comprises a step to energize predetermined heating elements through control signals from the controller for creating a predetermined marking through altering the surface portion of the workpiece comprising an altering taken from a group encompassing darkening, burning, foaming of the surface portion of the workpiece associated to said predetermined heating elements or creation of altered, darker or lighter molecules in the surface portion of the workpiece compared to adjacent surface portions of the workpiece;

wherein the surface structure of the solid material is a uniform smooth surface with an Ra-value of less than 100 nanometer or a uniformly rough surface with an Ra-value of more than 1 micrometer.

2. The method of claim 1, wherein the controller provides a double marking step; a first marking step when a mold is closed leading to a forming of a roughened surface at heated places at the predetermined heating elements and a second marking step when the mold is slightly opened with a predetermined mean distance between the surface portion of the workpiece and the surface of the predetermined heating elements leading to a forming of a smoothed previously rougher surface at the corresponding heated places.

3. The method according to claim 1, wherein an additive is mixed within the polymer material used in the thermal forming process, wherein the additive is chosen from chemical compounds taken from a group which changes its color due to decomposition or forming of a new intra-additive, inter-additive or polymer-additive chemical bond, change its fluorescence properties, liberate a gas or present foaming, recrystallization, exsolvation from the polymer, color change or carbonization, upon heating within the in-situ marking method.

4. A method for in-situ marking a workpiece in a thermal forming process of a polymer material, using a device comprising a surface directed towards the workpiece, wherein a number of individually controllable heating elements is distributed behind the surface for a local heating of a workpiece surface portion, wherein each of the individually controllable heating elements comprises a solid material having a surface structure and a heating structure, wherein the device further comprises a controller connected to the individually controllable heating elements, wherein the method comprises a step to energize predetermined heating elements through control signals from the controller for creating a predetermined marking through altering the surface portion of the workpiece, wherein the method step of energizing the predetermined heating elements by the controller is applied only after an opening of the mold of the thermal forming process when the workpiece is no longer in direct contact with a heating surface of the device but in close relationship with a predetermined mean distance between the surface portion of the workpiece and the surface of the predetermined heating elements, wherein the controller provides the predetermined energizing of the predetermined heating elements to liquefy the surface portion of the workpiece, followed by a solidification step creating sink marks at the surface portions vis-à-vis the predetermined energized heating elements.

5. A method for in-situ marking a workpiece in a thermal forming process of a polymer material, using a device comprising a surface directed towards the workpiece, wherein a number of individually controllable heating elements is distributed behind the surface for a local heating of a workpiece surface portion, wherein each of the individually controllable heating elements comprises a solid material having a surface structure and a heating structure, wherein the device further comprises a controller connected to the individually controllable heating elements, wherein the method comprises a step to energize predetermined heating elements through control signals from the controller for creating a predetermined marking through altering the surface portion of the workpiece, wherein the method step of energizing the predetermined heating elements by the controller is applied only after an opening of the mold of the thermal forming process when the workpiece is no longer in direct contact with a heating surface of the device but in close relationship with a predetermined mean distance between the surface portion of the workpiece and the surface of the predetermined heating elements, wherein the controller provides a predetermined energizing of the predetermined heating elements to smooth a rough surface of the workpiece with a Ra-value of more than 1 micrometer, followed by a solidification step creating a glossy surface at the surface portions vis-à-vis the predetermined energized heating elements.

\* \* \* \* \*